Oct. 26, 1926.

P. W. FLEISCHER

1,604,402

FISH DRAINING ATTACHMENT

Filed June 2, 1921 6 Sheets-Sheet 1

INVENTOR
Paul W. Fleischer
BY Munday, Clarke &
Carpenter
ATTORNEY

Oct. 26, 1926.

P. W. FLEISCHER

1,604,402

FISH DRAINING ATTACHMENT

Filed June 2, 1921   6 Sheets-Sheet 3

INVENTOR.
Paul W. Fleischer
BY Munday, Clarke &
Carpenter
ATTORNEY

Oct. 26, 1926.

P. W. FLEISCHER

FISH DRAINING ATTACHMENT

Filed June 2, 1921   6 Sheets-Sheet 5

INVENTOR
Paul W. Fleischer
BY Munday, Clarke &
Carpenter
ATTORNEY

Oct. 26, 1926. 1,604,402
P. W. FLEISCHER
FISH DRAINING ATTACHMENT
Filed June 2, 1921   6 Sheets-Sheet 6

INVENTOR.
Paul W. Fleischer
BY Munday, Clarke & Carpenter
ATTORNEY

Patented Oct. 26, 1926.

1,604,402

UNITED STATES PATENT OFFICE.

PAUL W. FLEISCHER, OF WEEHAWKEN, NEW JERSEY, ASSIGNOR TO AMERICAN CAN COMPANY, OF NEW YORK, N. Y., A CORPORATION OF NEW JERSEY.

FISH-DRAINING ATTACHMENT.

Application filed June 2, 1921. Serial No. 474,533.

This invention relates in general to machinery for processing and packing canned products and has more specific reference to means for draining cooking or other liquid from the filled cans prior to the hermetic closing or sealing thereof. While the embodiment herein shown relates in particular to such means adapted for use in connection with a cooking machine, and is especially arranged to accommodate sardine type fish cans, it will be understood that it is adaptable for widely varied uses both in connection with processing machines of other types and with cans of different shape and content.

A principal object of the invention is the provision of draining means adapted to receive the cans as they are delivered from the cooking machine and to convey them in inverted position above the receptacle of the machine, whereby to drain the liquid therefrom, and then to discharge them from said machine in righted position.

A further object of the invention is the provision of means associated with said conveyor means, for diverting the dripping liquid from the inverted cans from the path of the upright drained cans as they are being delivered from the draining attachment, and for directing the liquid back into the cooking receptacle of the machine.

A still further object of the invention is the provision of a draining attachment of this character which is operable by the usual power means employed to deliver the filled cans from the cooking receptacle and requiring but little additional mechanism to accomplish this result.

Another and important object of the invention is the provision of a discharge conveyor operating in conjunction with the main conveyor of the draining attachment, and adapted to deliver the drained cans to a hermetic closing machine, or other mechanism adapted to perform the next operation upon the cans.

Numerous other objects and advantages of the invention will be apparent as it is better understood from the following description, which, taken in connection with the accompanying drawings, discloses a preferred embodiment thereof.

Referring to the drawings.

Figure 13:
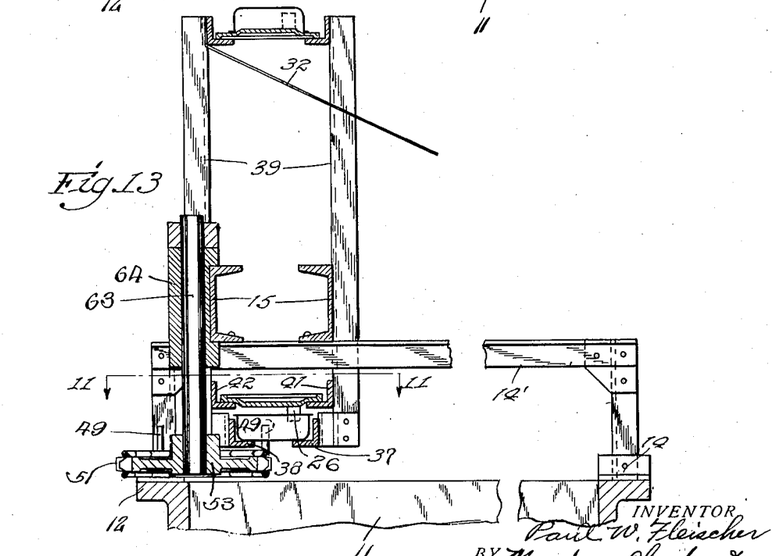
Fig. 13 is an enlarged transverse vertical section taken substantially on the lines 13—13 of Figs. 1 to 4 inclusive.
Figure 14:
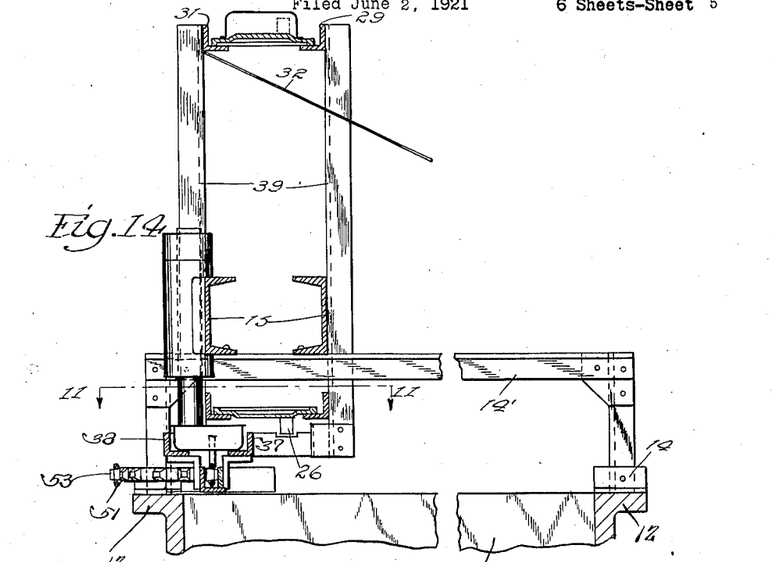
Fig. 14 is a similar section taken substantially on the lines 14—14 of the same figures.

Upon the drawings, employed for the purpose of illustrating the invention, I have shown in outline a cooking receptacle 11 having upper flanges 12, upon which my draining attachment 13 is supported. The sustaining means for the attachment comprise feet 14 (Figs. 13 and 14) secured to said flanges and to cross beams 14' which are secured to structural steel channels 15, which form the principal frame work of the attachment.

Figure 15:
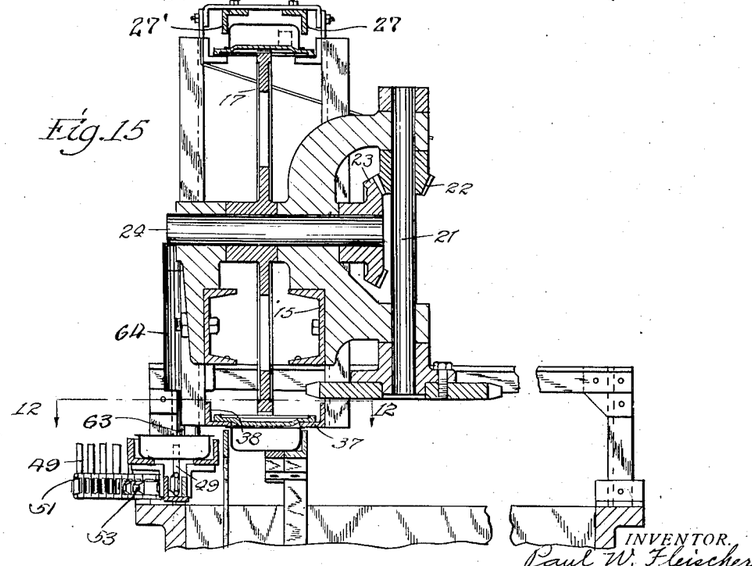
Fig. 15 is a similar section taken substantially on the lines 15—15 of the same figures.
Figure 16:
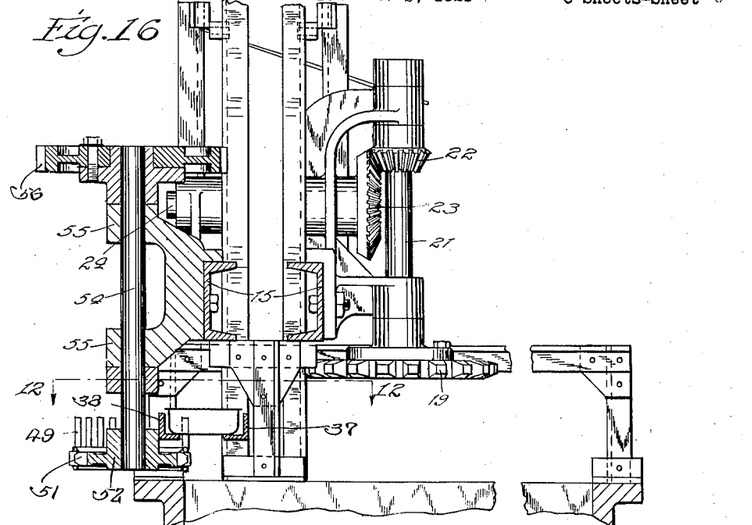
Fig. 16 is a similar section taken substantially on the lines 16—16 of the same figures.

The draining attachment proper comprises a conveyor 16 which is trained around a driving sprocket 17 at one end and an idler sprocket 18 at the other. The driving sprocket 17 is driven by means of a chain sprocket 19 (Figs. 15 and 16) which drives a vertical shaft 21 upon which is carried a bevel pinion 22 meshing with a bevel gear 23 upon a shaft 24 which also carries the large sprocket 17, the transmission of power to the chain sprocket 19 being accomplished in a manner to be hereinafter described.

The filled cans are delivered from the cooking machine upon an upwardly extending conveyor 25 (Fig. 3), and as they are brought beneath the lower path of the chain conveyor 16 at the point where it starts up over the sprocket 17 they are engaged by lugs 26 on the conveyor and passed beneath receiving guides 27 and 27', which are secured to the channel 15 and formed up around said sprocket, their receiving portions extending down into the receptacle on each side of the conveyor 25. As the conveyor moves around the sprocket 17 the cans are inverted and the greater part of the liquid discharged therefrom.

Figures 6, 7:
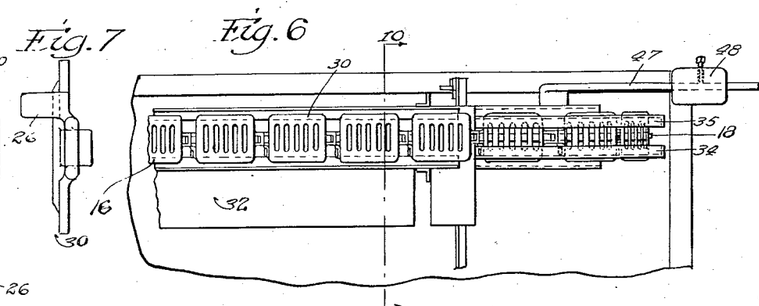
Fig. 6 is a plan view of the parts shown in Fig. 5.
Fig. 7 is an end elevation of one of the links employed in the main conveyor.
Figure 8:
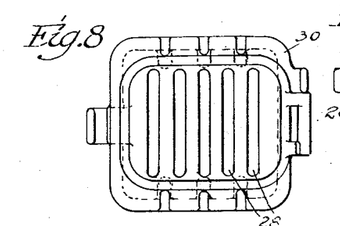
Fig. 8 is a plan view of the same, showing the fenestrated form of the link.
Figure 9:
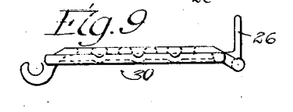
Fig. 9 is a side elevation of the link.
Figure 10:
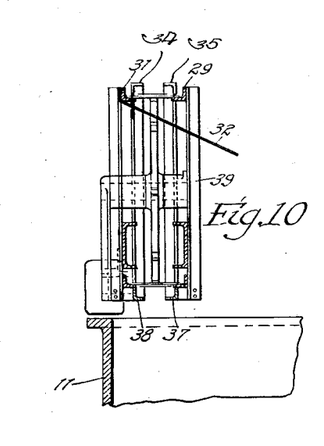
Fig. 10 is a transverse vertical section taken substantially on the lines 10—10 of Figs. 1, 2, 5 and 6.

It will be noted by reference to Figs. 7 to 9 inclusive that the links 30 of the conveyor 16, upon which the cans are carried, are fenestrated and the raised portions of the link between the fenestræ 28 are beveled to permit centralizing of the cans, this arrangement serving to prevent spilling of the solid contents while at the same time allowing the liquid to escape back into the cooking receptacle. The cans in this inverted position are conveyed the entire length of the draining attachment to permit thorough draining of the liquid therefrom, which is accomplished in the manner indicated in Fig. 3. Along the upper section of the conveyor are can guides 29 and 31, serving also as supports for the conveyor 16.

32 is a drip guard sustained by frame brackets 33 (Figs. 3 and 13), which deflects the drainings from the inverted cans back into the receptacle 11, without allowing them to fall into cans which may be under the upper leg of the conveyer 16.

Figure 5:
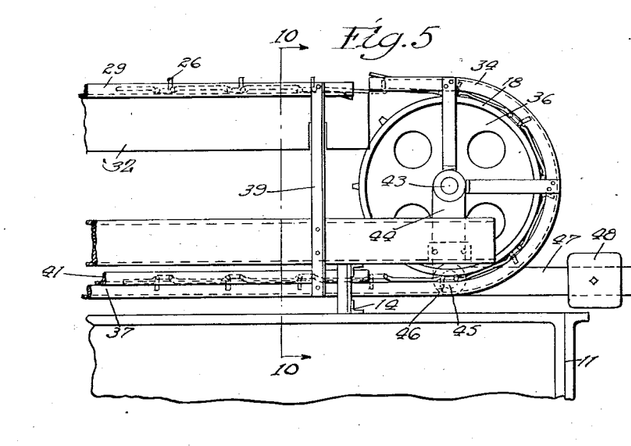
Fig. 5 is an enlarged side elevation of the end of the draining attachment opposite that shown in Fig. 3.

At the opposite end of the conveyor are circular guides 34 and 35 (Figs. 5 and 6) through which the cans pass in descending around the idler sprocket 18, and by means of which said cans are restored to upright position, and are thus delivered between guides 37 and 38 (Figs. 11 and 12), which guides are supported by means of upstanding struts 39 (Figs. 13 and 14) which also sustain the upper guides 29 and 31. Immediately above these lower can guides 37 and 38 are conveyor guides 41 and 42 through which the conveyor 16 passes with its links in inverted position, so that the lugs 26 which now extend downwardly, engage and drive the cans between the guides 37 and 38.

The idler sprocket 18 runs upon a stud 43, which is secured in a pair of swinging links 44 (Fig. 5), which in turn are secured to a shaft 45 journaled in bearings 46, which are secured to the channel members 15. Upon the shaft 45 is also secured a weight lever 47, the purpose of which is to keep the conveyor taut at all times. This weight may manifestly be of any suitable size and construction, and may be exchanged for others as conditions may demand.

Figure 11:
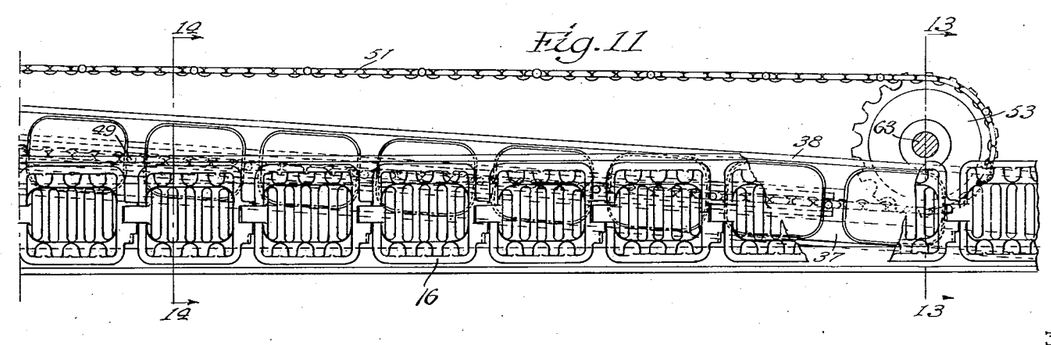
Fig. 11 is a sectional plan view of the mechanism employed to deflect the cans from the main conveyor to the discharge conveyor and is taken substantially on the lines 11—11 of Figs. 13 and 14.
Figure 12:
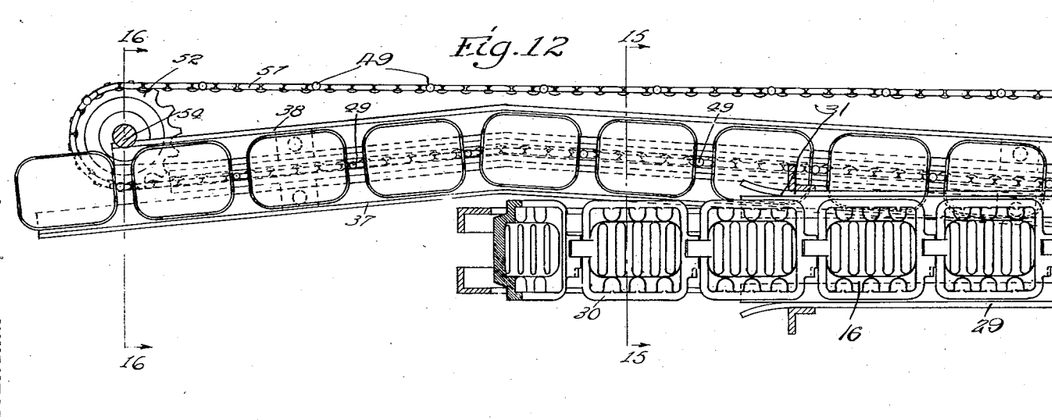
Fig. 12 is a continuation of the mechanism shown in Fig. 11, showing the delivery end of the draining attachment, and is taken substantially on the lines 12—12 of Figs. 15 and 16.

Referring particularly to Figs. 11 and 12, it will be noted that the guides 37 and 38 beneath the conveyor are veered inwardly from the path of the main conveyor so that the cans are gradually removed from the control thereof. As they leave the control of of this conveyor they are engaged by upstanding lugs 49 which protrude at intervals from the links of a discharge conveyor 51 which is operated in a manner to be now described.

Figure 2:
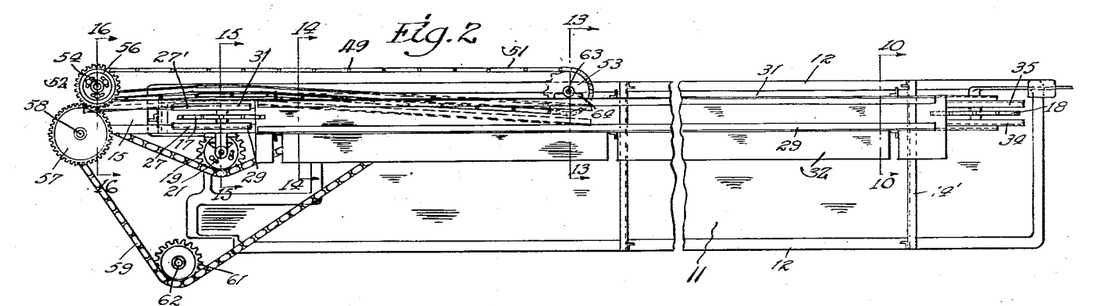
Fig. 2 is a plan view of the draining attachment and driving mechanism, and an outline of the cooking machine, the conveyor 16 being removed.

This conveyor is trained around horizontal sprockets 52 and 53, the former being the driver and the latter idle. The sprocket 52 is carried on the lower end of a vertical shaft 54 (Fig. 16), this shaft being journaled in a bracket 55 and carrying at its opposite end a gear 56 which meshes with and is driven by a gear 57 (Fig. 2) carried on a shaft 58, which may be a part of the driving mechanism of a closing machine or other mechanism to which the cans are delivered from the cooking machine. At the lower end of the shaft 58 is carried a sprocket (not shown) and over which is trained a chain 59 which extends around a sprocket 61 carried on a shaft 62, said chain being trained around another sprocket (not shown) positioned inwardly from the shaft 58, and driving the sprocket 19 to operate the main conveyor mechanism of the draining attachment. The idler sprocket 53 is secured on a shaft 63 (Fig. 13) which has bearing 64 secured to one of the channel members 15. The action of the conveyor 51 is timed in such manner with relation to the conveyor 16 that the upstanding lugs 49 engage behind the cans in advance of the depending lugs 26 so that the cans come under the exclusive control of the discharge conveyor immediately upon arriving at the position where they are engaged by said lugs 49. They are moved by this conveyor to a closing machine or other mechanism as hereinbefore referred to, for further operations.

The conveyer 51 is or may be deflected, as shown in Fig. 12, which deflection first takes the cans out from under the conveyer 16 and then directs them somewhat inwardly so as to avoid the shaft 54, this last returning deflection of the cans being made after they have passed out beyond the receiving end of the conveyer 16.

In operation, the cans, after the contents thereof have been cooked, are placed upon the conveyer 25, this being done in any convenient manner as, for example, by means of the continuously moving conveyer 24 shown in Patent No. 1,330,456, granted Feb. 10, 1920, to Wm. E. Taylor, for a cooking machine with which the apparatus of my invention is particularly adapted to be used. It will be understood that the cans at this time have not yet been closed and contain a considerable quantity of the cooking liquid, which, in the cooking of sardines, is ordinarily olive, or other oil.

Figure 3:
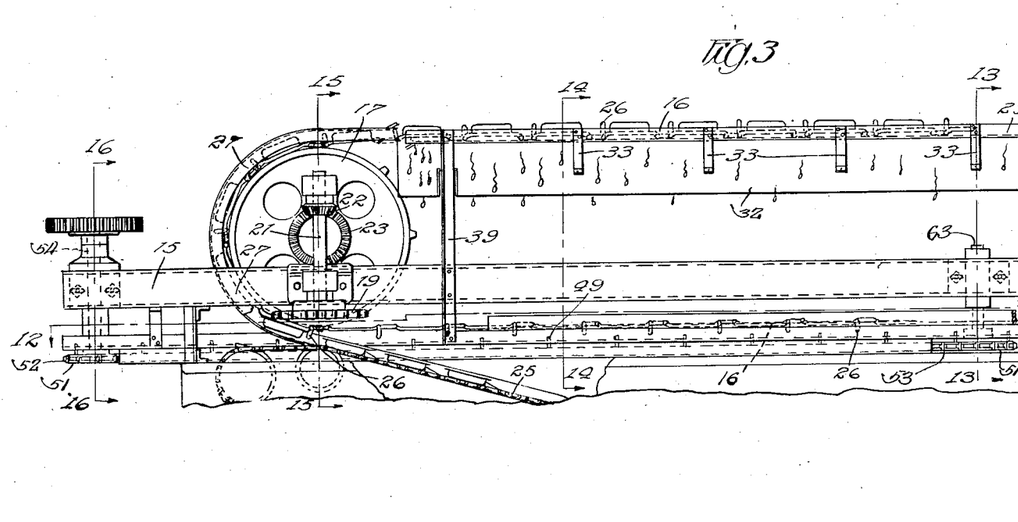
Fig. 3 is an enlarged side elevation of the delivery end of the machine showing the means whereby the cans are transferred from the cooking receptacle to the main conveyor of the draining attachment.
Figure 4:
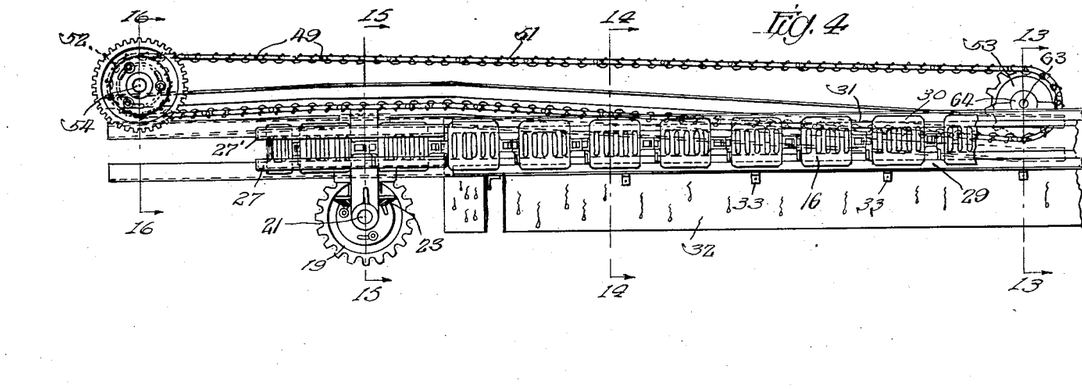
Fig. 4 is a plan view of the part of the draining attachment shown in Fig. 3, and showing also the relative position of the discharge conveyor employed for delivering the drained cans from the machine.

The conveyer 25, it will be noted, corresponds to the conveyer 27 of said prior patent to Taylor and as the cans, in upright position, are discharged from the cooking receptacle by means of this conveyer, they are directed between the guides 27, 27' and are engaged by the lugs 26 of the conveyer 16 adjacent the point where the latter begins its ascent over the sprocket 17 (see Fig. 3). The links, or grids, 30, are brought into contact with the contents of the cans and, as the latter are inverted by movement of the conveyer 16 around the sprocket 17 the solid contents are kept from spilling by said grids. The excess liquid, however, is permitted to drain out as the cans are moved along the upper run of the conveyer, the drip guard 32 serving to direct said liquid away from the lower run of the conveyer and causing it to drain back into the receptacle 11 (see Figs. 3 and 13).

Figure 1:
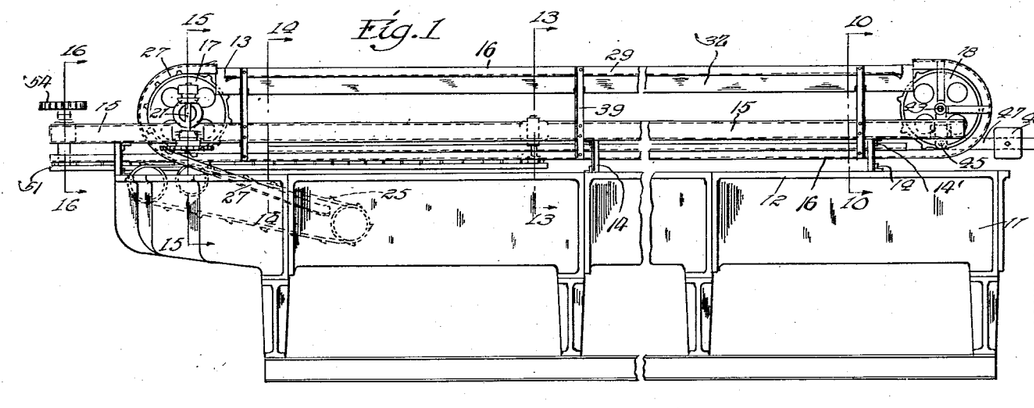
Fig. 1 is a side elevation of a cooking machine with a draining attachment, embodying my invention, superimposed upon it.

At the right hand end of the conveyer, viewing Fig. 1, the cans are directed around the sprocket 18, being held to the conveyer by means of the guides 34 and 35 and are restored to upright position in which they are directed by means of the conveyer lugs 26 through the guides 37 and 38 beneath said conveyer.

As the cans approach the delivery end of the machine, they are taken from the conveyer 16 by means of the delivery conveyer 51 and directed out of the machine, preferably to a closing machine, such as is shown in Patent No. 1,200,273, granted Oct. 3, 1916, to Wm. E. Taylor.

The conveyers 16 and 51 are driven in the manner hereinbefore described and the conveyer 25, which is, in reality, a part of the cooking machine and is only diagrammatically shown, may be operated in any preferred manner, a satisfactory method being that shown in said Taylor Patent No. 1,330,456.

It will thus be apparent that the cans may be drained to desired extent after being removed from the cooking machine proper and prior to delivery to the closing machine by simply directing them around an additional conveyer so arranged that said cans are inverted upon one run of the conveyer, provision, of course, being made for receiving and discharging the cans and for suitably supporting and preventing spilling of the solid contents thereof during the operation.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a cooking machine, a receptacle for cooking liquid, a conveyor for elevating cans therefrom, and a draining device superimposed upon said receptacle and above said elevating conveyor, said device comprising a link conveyor extending over the receptacle and adapted to carry the cans in inverted position whereby to drain the liquid therefrom, means at each end of said conveyor for inverting the position of the cans, and discharge means for delivering the drained cans from the machine.

2. In a cooking machine, a receptacle for cooking liquid, a conveyor for elevating cans therefrom, and a draining device superimposed upon said receptacle and above said elevating conveyor, said device comprising sprockets, a conveyor driven and guided thereby and having apertured links to sustain the inverted filled cans whereby both to prevent spilling of the solid contents and to permit escape of the liquid, said conveyor extending over said receptacle and being adapted to carry the cans in one direction in inverted position and to move them in the other direction in upright position, means at either end of the conveyor for inverting the position of the cans and a discharge conveyor for delivering the drained cans from the machine.

3. In a cooking machine, a receptacle for cooking liquid, a conveyor for elevating cans therefrom, and a draining device superimposed upon said receptacle and above said elevating conveyor, said device comprising sprockets, a conveyor driven and guided thereby and having apertured links to sustain the inverted filled cans whereby both to prevent spilling of the solid contents and to permit escape of the liquid, said conveyor extending over said receptacle and being adapted to carry the cans in one direction in inverted position and to move them in the other direction in upright position, means at either end of the conveyor for inverting the position of the cans, a discharge conveyor for delivering the drained cans from the machine, and means for transferring the cans from the control of said main conveyor to that of said discharge conveyor.

4. In a cooking machine, a receptacle for cooking liquid, means for removing cans therefrom and a device mounted above said receptacle for inverting said cans and for carrying them in inverted position above the receptacle whereby to drain the liquid therefrom.

5. In a cooking machine, a receptacle for cooking liquid, a conveyor for moving the cans therefrom, and a device mounted above said receptacle for engaging and inverting the cans as they move on said conveyor, and conveying them in inverted position above said receptacle, and for righting and delivering them from the machine.

6. In a cooking machine, a receptacle for cooking liquid, means for delivering filled cans therefrom and a device for draining the cans, said device comprising means for inverting said cans as they are moved from said receptacle, means for conveying them in inverted position above the receptacle, means for restoring them to upright position, and discharge means for delivering the drained cans from the machine.

7. In a cooking machine, a receptacle for cooking liquid, means for moving filled cans therefrom, and a conveyor apparatus mounted above the receptacle and adapted to receive the filled cans from said moving means and to move them in inverted position over the open receptacle whereby to drain the cooking or other liquid therefrom.

8. In a cooking machine, a receptacle for cooking liquid, means for moving filled cans therefrom, a conveyor apparatus mounted above the receptacle and adapted to receive the filled cans from said moving means and to move them in inverted position over the open receptacle whereby to drain the cooking or other liquid therefrom, and guiding means associated with said conveyor apparatus for inverting the position of the cans.

9. In a cooking machine, a receptacle for cooking liquid, means for moving filled cans therefrom, a conveyor apparatus mounted above the receptacle and adapted to receive the filled cans from said moving means and to move them in inverted position over the open receptacle whereby to drain the cooking or other liquid therefrom, and guiding means associated with each end of the conveyor apparatus for inverting the position of the cans.

10. In a cooking machine, a receptacle for cooking liquid, means for moving filled cans therefrom and means superimposed upon the body of said machine for draining the filled cans and for delivering them from the machine, said draining means comprising associated conveyors, one adapted to move the cans in inverted position back over the open receptacle, and another adapted to receive said cans from said first mentioned conveyor as they are restored to upright position and to deliver them from the machine.

11. In a cooking machine, a receptacle for cooking liquid, means for moving filled cans therefrom and means superimposed upon the body of said machine for draining the filled cans and for delivering them from the machine, said draining means comprising a conveyor having fenestrated links and can driving lugs, sprockets over which said conveyor is trained, means associated with said sprockets for inverting the position of the cans, and a discharge conveyor adapted to move the cans from the control of the first mentioned conveyor and convey them away from the machine.

12. In a cooking machine, a receptacle for cooking liquid, means for moving filled cans therefrom and means superimposed upon the body of said machine for draining the filled cans and for delivering them from the machine, said draining means comprising a conveyor having fenestrated links and can driving lugs, sprockets over which said conveyor is trained, means associated with said sprockets for inverting the position of the cans, and a discharge conveyor having timed movement with respect to said first mentioned conveyor whereby to move the drained cans from the control of said conveyor.

13. In a cooking machine, a receptacle for cooking liquid, means for moving filled cans therefrom and means superimposed upon the body of said machine for draining the filled cans and for delivering them from the machine, said draining means comprising a conveyor having fenestrated links and can driving lugs, sprockets over which said conveyor is trained, means associated with said sprockets for inverting the position of the cans, and a discharge conveyor moving in a path veered at predetermined points away from said first mentioned conveyor, and having means for engaging the cans to move them from the control of said conveyor.

14. In a cooking machine, a receptacle for cooking liquid, means for moving filled cans therefrom, a conveyor apparatus positioned above said receptacle and having means for engaging said cans as they advance on said moving means and for inverting them, means for moving them in inverted position above the receptacle whereby to drain them, means for restoring the cans to upright position and for delivering them from the machine, and a drip guard positioned beneath the upper part of said conveyor apparatus and adapted to deflect the dripping liquid from the path of the drained cans.

15. In a cooking machine, a receptacle for cooking liquid, means for moving filled cans therefrom, a conveyor apparatus positioned above said receptacle and having means for engaging said cans as they advance on said moving means and for inverting them, means for moving them in inverted position above the receptacle whereby to drain them, means for restoring the cans to upright position and for delivering them from the machine, and an obliquely arranged drip guard positioned beneath the upper part of said conveyor apparatus and adapted to deflect the dripping liquid from the path of the drained cans.

16. In a cooking machine, a receptacle for cooking liquid, means for moving filled cans therefrom, an endless conveyor positioned above said receptacle, vertically operating sprockets over which said conveyor is trained, one of said sprockets being a driver, means associated with said conveyor and sprockets for engaging and inverting the position of the cans, and a discharge conveyor trained over horizontally operating sprockets and positioned and timed with relation to said first mentioned conveyor in such manner as to permit engagement of the cans as they are moved beneath said conveyor and to transfer control of said cans from the one conveyor to the other.

17. In a cooking machine, a tank, means for moving filled cans from said tank, and a draining device superimposed upon said tank and adapted to receive the filled cans from said moving means, said device comprising sprocket wheels, a chain conveyor driven and guided by said sprocket wheels and having links each adapted to support a can in inverted position, said conveyor being constructed in such manner as to support the cans when moving on one level and in one direction, and having lugs adapted to engage and move the cans when said conveyor is moving on its lower level and in the other direction, and means beneath the lower level of said conveyor for giding the cans.

18. In a cooking machine, the combination of a receptacle for cooking liquid, and means for receiving and draining filled cans after the contents thereof have been cooked in said liquid, the means for draining the cans being arranged to drain them into said receptacle.

19. In a cooking machine, the combination of a receptacle for cooking liquid, a conveyer for delivering filled cans from said receptacle, and a separate conveyer adapted to receive said cans from said first-mentioned conveyer and propel them in position causing the liquid contents thereof to drain back into said receptacle.

20. In a cooking machine, the combination of a receptacle for cooking liquid, a conveyer for delivering filled cans from said receptacle, and a separate conveyer adapted to receive said cans from said first-mentioned conveyer and propel them in position causing the liquid contents to drain therefrom prior to final discharge of the cans from the machine.

PAUL W. FLEISCHER.